United States Patent [19]

Vanderzee

[11] 4,229,246

[45] Oct. 21, 1980

[54] BUILDING DRUM ASSEMBLY

[75] Inventor: Robert S. Vanderzee, Akron, Ohio

[73] Assignee: The Steelastic Company, Akron, Ohio

[21] Appl. No.: 970,570

[22] Filed: Dec. 18, 1978

[51] Int. Cl.³ .......................................... B29H 17/22
[52] U.S. Cl. .................................. 156/417; 156/132; 156/403
[58] Field of Search ........ 156/131, 132, 398, 400–403, 156/414–420

[56] References Cited

U.S. PATENT DOCUMENTS

| 2,614,952 | 10/1952 | Kraft | 156/417 |
|---|---|---|---|
| 3,017,919 | 1/1962 | McMahon et al. | 156/400 |
| 3,053,308 | 9/1962 | Vanzo et al. | 156/416 |
| 3,077,917 | 2/1963 | Appleby | 156/416 |
| 3,476,633 | 11/1969 | Henley | 156/415 |
| 3,654,007 | 4/1972 | Winstanley et al. | 156/132 |
| 3,816,218 | 6/1974 | Felten | 156/398 |
| 3,833,444 | 9/1974 | Mallory | 156/400 |
| 3,833,445 | 9/1974 | Mallory et al. | 156/401 |
| 3,990,931 | 11/1976 | Leblond et al. | 156/131 |
| 4,060,445 | 11/1977 | Houck | 156/414 |
| 4,087,306 | 5/1978 | Head et al. | 156/401 |

FOREIGN PATENT DOCUMENTS 1246226 8/1967 Fed. Rep. of Germany ........... 156/415

Primary Examiner—John E. Kittle
Attorney, Agent, or Firm—Hamilton, Renner & Kenner

[57] ABSTRACT

A building drum assembly (10) mounted on a rotatable driveshaft (14) for the production of a cylindrical carcass (70) includes a drum (11) rotatably carried by the driveshaft (14) for receiving carcass material (60), a bead receiving area (16), means (53) for expanding the drum (11) and means (12 and 13) for turning carcass material (60) over a bead (64). Further provided are means (25 and 36) for the accurate positioning and securing of a bead (64) and means (24 and 25) for providing a substantially uniform and continuous support surface (19) for receiving the carcass material (60).

A method is also provided for the operation of the assembly and includes the steps of rotating the drum (11), applying a carcass material (60) to the drum (11), placing a bead (64) over the bead receiving area (16), expanding the drum (11), securing the bead (64) and turning a carcass material (60) over the bead (64).

10 Claims, 9 Drawing Figures

BUILDING DRUM ASSEMBLY

TECHNICAL FIELD

The present invention relates to a building drum assembly for the preparation of a generally cylindrical, elastomeric carcass from materials which include, but are not limited to, one or more body plies and two relatively inextensible beads. Among the articles capable of being built on a building drum assembly as is disclosed herein are radial and cross-ply tires, as well as air springs.

The construction of a radial tire conventionally is accomplished in two stages. In the first stage, one or more sheets of body or carcass ply material are run onto the surface of a rotating building drum, cut to the required size, are spliced and stitched to form a generally cylindrical, endless belt-type covering over the surface of the drum. Beads are positioned over the plies in the appropriate areas near each of the two outer edges of the now cylindrical ply structure.

The drum ceases rotation and is expanded such that the extensible ply material tightly contacts the interior circumference of the beads. The outer edges of ply material are turned over their respective beads to envelop the beads and to contact the portion of the ply material extending between the beads. The turned edges are then stitched to this median surface of the body or carcass plies. Sheets of sidewall strips are run onto the cylindrical carcass in the appropriate areas as the drum is again rotated, and are stitched in place.

The drum is then collapsed and the cylindrical carcass, now having a diameter approximately equal to that of the beads is removed from the drum. The manufacture of the tire may be continued on a single stage building drum assembly or completed by the transfer of the carcass to a second stage building drum, on which it is given a toroidal shape. Reinforced belts and the tread are run onto and stitched to the now toroidal carcass to complete an uncured tire of the required dimensions. The second stage operations may be performed on radial tire building machines of conventional design or on the second stage building drum described in the copending application Ser. No. 970,665 filed Dec. 18, 1978 owned by The Steelastic Company, the assignee of record herein. The uncured tire so constructed is then removed for ultimate transfer to a curing press.

Construction of a cross-ply tire proceeds similarly up to the step of running on sidewall strips, when tread strips are also added. After collapse of the drum, the cross-ply carcass is removed for shaping and vulcanization in a curing press.

BACKGROUND ART

In the manufacture of tires, a prime consideration is that each finished tire conform to engineering specifications. Variance from the requisite dimensions of a tire causes the buildup of stress forces within the structure of the tire during use. For example, radial force variation occuring during use of the tire is caused by improper positioning or slippage of the beads relative to each other during first stage construction of the tire carcass, such that the tire formed has an unequal length of tire cord between the beads along its circumference. This may result in premature tire wear as well as unsatisfactory tire performance.

Variance from uniformity and optimum dimensions cn also occur when the beads are placed either too close to or too far from each other. In the former instance, with the beads set too close together, cord length between beads will be insufficient, causing thinning of the innerliner material around the interior surfaces of the tire and excessive or uncontrolled slippage of ply materials around the beads during the curing operation. In the latter instance, with the beads set too far apart, cord length between beads in the resulting tire carcass will be excessive, tending to cause a variety of performance problems including radial force variation and radial runout.

In addition to the foregoing problems which may occur in a single tire when the beads are not properly set with regard to a given tire size, steering and ride problems can develop in a vehicle on which tires of varying dimensions within one general tire size are used, the tires varying because of the possibility of bead distance variation over a production run in previous tire building drums. This variation may be due to either the positioning of the beads before drum expansion, or to the slipping or movement of the beads during or subsequent to expansion. Previous tire building drums have commonly been made adjustable to accomodate a variety of tire sizes such that operator misadjustment or the wear of the adjusting parts can occasion the improper setting of the beads. The surface design of previous drums themselves allows such improper setting of the beads.

There are two basic types of building drums with respect to the positioning and securing of beads to carcass ply material. The first is the non-expanding drum, on which the ply material is bent over the drum edges and the beads are set onto the plies against the sides of the drum. The second type is the expanding drum on which the beads are positioned over the ply material and which is then expanded to permit the plies to contact the beads. This second type includes drums having shallow bead grooves to facilitate positioning of the beads, deep bead grooves to facilitate positioning and securing of the beads, and drums with a formed edge for receiving the beads.

Some early tire building drums had rather steep inclined surfaces at their edges, over which the ply material was wrapped and against which the beads were pressed. Bead slippage and inexactitude of positioning along the inclined surface of the drum could readily occur prior to the wrapping of ply material around the bead. Mere tack adhesion between the bead and green ply material was relied on to secure the bead during the building operation. In addition, the inclined surface failed to present a satisfactory support surface for running on and stitching the body plies, resulting in the folding or crimping and ultimately, the separating of the plies. The securing and accurate positioning of the beads also proved insufficient in the building drums which utilized only shallow bead grooves. Accurate spacing between the beads, and thus required cord length between the beads in the carcass could not be adequately guaranteed because of the possibility of bead travel or slippage during the building operation, and also because of inherent inaccuracies in the positioning of bead setting rings relative to the drum.

Other tire building drums have deeply recessed bead receiving grooves on their surfaces. Body ply materials, which are sheets of uncured elastomeric material, are placed over the surface of the drum, including the recessed areas. Because the body plies are relatively flexible, they tend to fall into the recess and either fold, or crimp. Adequate stitching in those areas is frustrated. The surface of the drum is expanded so as to contact the beads which are positioned about the recessed areas. As the drum expands, the ply material directly over the bead grooves must travel slightly laterally relative to the drum and groove surfaces in order to accommodate the beads in the bead receiving grooves. This lateral travel across the drum and groove surfaces induces further folding, wrinkling, or other deformations which cause inaccuracy in the positioning of the beads and ultimately in the carcass produced.

Still other drums have an initially flat surface on which the body plies are run. The interior portion of the drum is expanded, leaving the edges depressed for receiving the bead. As the interior is expanded, excess body ply fabric may be pulled into the bead receiving area, resulting in folds or crimps before the bead contacts the fabric. Positioning of the bead is also made uncertain in these drums, in which the bead receiving area normally lacks a bead restraint to prevent bead slippage or movement toward the edges of the drum.

DISCLOSURE OF THE INVENTION

It is therefore an object of the present invention to provide a novel building drum assembly for the construction of first stage radial and cross-ply tires, air springs and the like.

It is a further object of the present invention to provide a novel building drum assembly which facilitates the uniform application and stitching of body ply materials to form improved carcasses.

It is another object of the present invention to provide a novel building drum assembly which facilitates the application, positioning and securing of beads onto the body ply materials to form improved carcasses.

It is yet another object of the present invention to provide a novel building drum assembly which incorporates features to improve tire uniformity, to speed the building operation and to produce improved tires with consistency.

In general, the building drum assembly includes an expandable drum, mounted on and rotatable with a drive-shaft of a tire building machine or similar apparatus and having bead receiving areas disposed about its surface. Also provided are means for expanding and collapsing the drum, and means for turning body ply material over beads and stitching the same.

The operation of the building drum assembly of the present invention includes the steps of running body ply material onto the rotatable drum, positioning beads so as to be radially disposed with respect to the bead receiving areas, expanding the drum, securing the beads, turning the ends of the body ply material over the beads, stitching the ply material over the bead and onto the ply median portion, collapsing the drum and removing the carcass therefrom.

PREFERRED MODES FOR CARRYING OUT THE INVENTION

Figure 1:
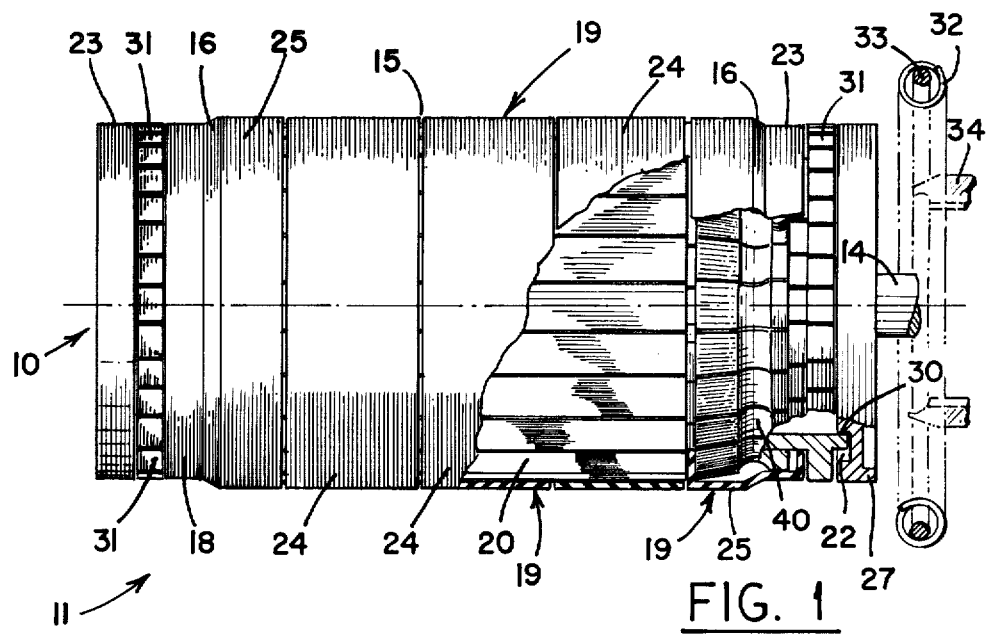
FIG. 1 is a front-elevation partially in section of the building drum assembly of the present invention in which the drum is collapsed for the receipt of body ply material.
Figure 2:
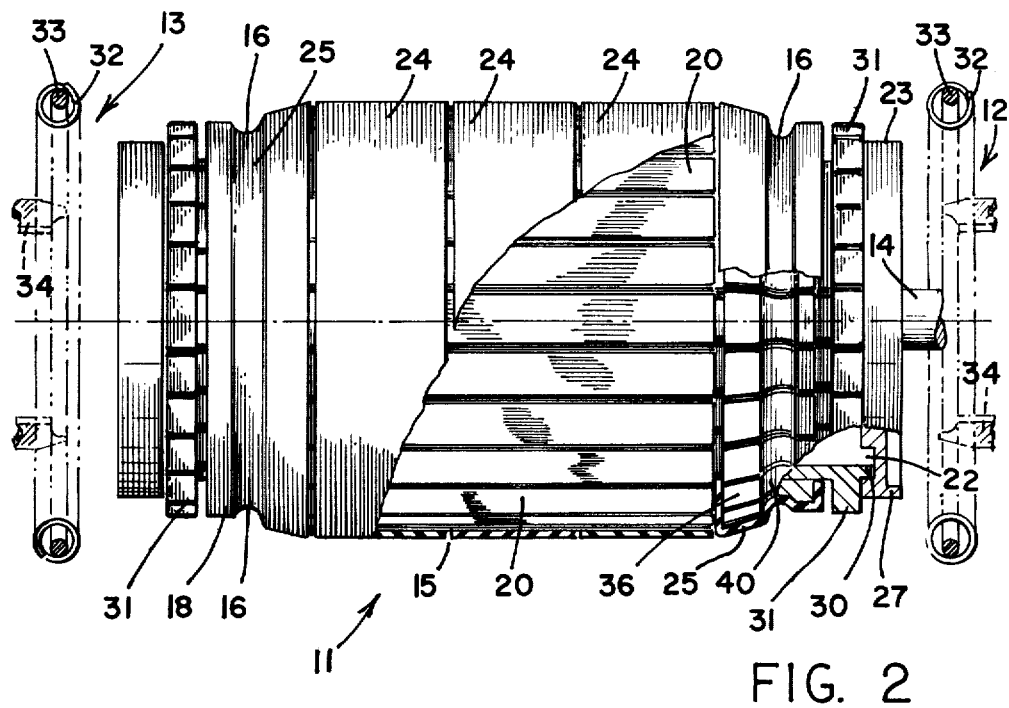
FIG. 2 is a front-elevation partially in section of the building drum assembly of the present invention in which the drum is expanded.

The building drum assembly of the present invention is best depicted in FIGS. 1 and 2, and is indicated generally by the numeral 10. The assembly 10 is mounted on a frame (not shown for clarity) and includes the drum, generally 11, and inboard and outboard turnover spring assemblies, generally 12 and 13, respectively.

The drum 11 is mounted on and rotatable with a driveshaft 14 which is operatively connected to a motor (not shown). The motor, driveshaft 14 and associated frame are components of a conventional building machine which can be altered as desired to carry the drum assembly 10. The drum 11 has a broad, cylindrical median portion 15 and two bead receiving areas 16 distal thereto and extending about the circumference of the drum 11. The bead receiving areas 16, each positioned toward opposite edges of the drum 11, may comprise a slightly inclined face on the collapsed drum 11, sloping down to a shoulder portion 18 of slightly less diameter than the median portion 15.

Figure 3:
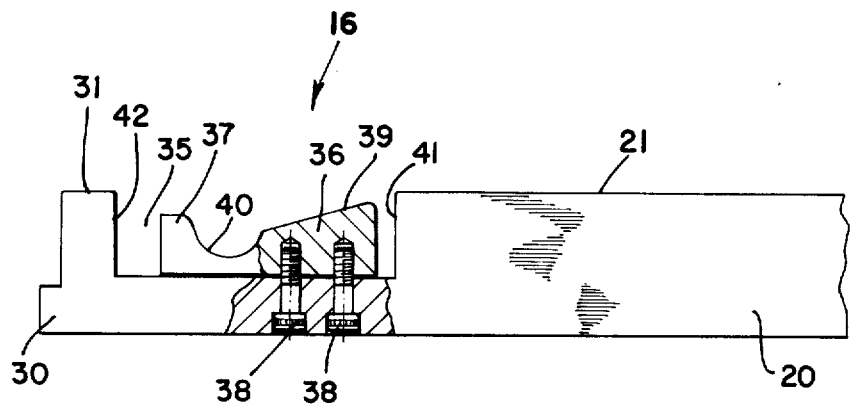
FIG. 3 is an enlarged front-elevation partially in section of a portion of a drum segment having a bead receiving seat.

The drum 11 generally comprises a plurality of drum segments 20, an enlarged section of one such segment being depicted in FIG. 3. Each drum segment 20 is positioned adjacent to two other drum segments 20 along their longitudinal axes. Each drum segment 20 is positioned with its vertical axis tilted with respect to the segments 20 adjacent it, such that the outer surface 21 of all the segments 20 together define the substantially continuous surface of a cylinder. The outer surface 21 of each segment 20 may either be substantially flat or slightly curved about the segment's 20 longitudinal axis. The length of the segments 20 and particularly the distance between the bead receiving areas 16 in part defined on the segments 20, is determined by the diameter of the tire to be produced. The width of each segment 20, as well as the number of segments 20 to be used in the drum 11, is determined by the tire size desired.

Each drum segment 20 is slidable radially with respect to the longitudinal axis of the drum 11 within slots 22 journaled in end plates 23 which hold the segments 20 at each end, the end plates 23 being analogous to the bases of the cylindrical surface defined by the segments 20.

The median portion 15 of the drum 11 may be covered by at least one expandable tension band 24 of elastomeric or similar material, which additionally forms a substantially smooth, continuous cylindrical surface 19 over the outer segment surfaces 21. The bead receiving areas 16 of the drum 11 are each covered by an expandable boot 25, also made of elastomeric or similar material. The boot 25, which is depicted in cross section in FIGS. 4–6, has an outer diameter in its platform portion 26 equal to the outer diameter of the tension band 24. The platform portion 26 of the boot 25 lies adjacent to the tension band 24, thereby contributing to the continuous support 19.

Referring back to FIG. 1, the outer diameter of the boot 25 may decrease over the bead receiving area 16 in a slope portion 28 of the boot 25, when the drum 11 is in the collapsed position, to reach a plateau in the boot shoulder portion 29 of lesser diameter than in the platform portion 26. Such a decrease in diameter in this and in associated portions of the drum 11 serve to accommodate various types of mechanical ply turnup devices, if desired, or to compensate for relatively thick carcass ply materials, as is discussed herein. Beyond the boot shoulder 29, toward the edges of the drum 11, there is exposed an end portion 31 of the drum segments 20 on the surface of the drum 11, adjacent to the end plates 23. The end plates 23 may be fitted with extensions 27 for providing further support as may be required.

The inboard and outboard turnover spring assemblies 12 and 13 each are comprised of a coiled turnover spring 32 which is helically coiled about a circular support ring 33. The support ring 33 is attached to a plurality of arms 34 which extend toward the drum 11 from a plate (not shown). The inboard turnover spring assembly 12 is actuated by a piston of a double acting cylinder (not shown) and reciprocates on the driveshaft 14 such that its coiled turnover spring 32 can engage and disengage with the surface of the drum 11. The outboard turnover spring assembly 13 may either be reciprocably movable on a piston of a double acting cylinder, the piston having its longitudinal axis on the same line as does the driveshaft 14 so as to engage and disengage the surface of the drum 11, or it may be carried on an assembly which swings into position for such engagement. The outboard turnover spring assembly 13 must, of course, move out of contact with the drum 11 a sufficient distance so as to permit removal of the carcass from the drum 11.

A portion of the left side of a drum segment 20 is shown in FIG. 3, the right side of the segment, while not shown, is merely the mirror image of the left. Each drum segment 20 has an axial flange 30 at its outermost extent which communicates with the slot 22 in the end plate 23. Each segment 20 also has a rectangular cavity 35 which accommodates a rigid bead receiving seat 36 fastened to the segment 20 by two machine screws 38.

Figure 4:
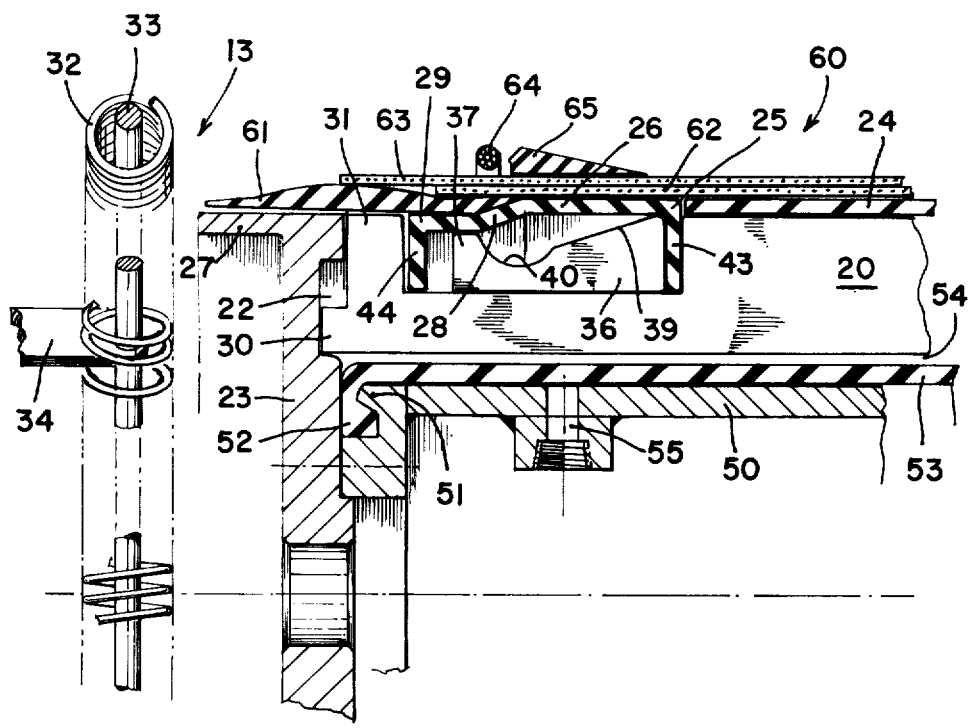
FIG. 4 is an enlarged front-elevation partially in section of a portion of the collapsed drum upon which body ply material has been run and a bead has been set.

The seat 36 may have an outer edge 37 for restraining the bead from outward axial movement when the drum 11 is expanded, and an inclined portion 39, sloping off into a groove 40, for accommodating bead apex material if required for the carcass. The seat outer edge 37 may extend to nearly the same height as the highest point of the seat incline 39. The seat outer edges 37, the seat inclines 39 and the grooves 40 of all the drum segments 20 extend circumferentially around the drum 11. These areas are not apparent on the surface of the drum 11 when it is in its collapsed position, because they are covered by the boot 25, which thus provides a relatively flat surface 19 for the proper application to the drum 11 of the carcass building materials, as depicted in FIG. 4. The seat 36 is positioned within the cavity 35 but does not contact its walls, and is positioned closer to the inner wall 41 formed by that portion of the segment 20 contributing to the drum median portion 15 than to the outer wall 42 formed by the segment end portion 31. If the drum segment 20 is designed without an end portion 31, the outer wall 42 is formed by the end plate 23.

The boot 25 is held over the seat 36 by an inner leg 43 which is pressure fit between the seat 36 and the inner wall 41. The boot 25 is stabilized by an outer leg 44 that rests between the seat 36 and the outer wall 42 and that is of lesser width than the distance between the seat 36 and the outer wall 42, such that it may slide laterally freely within that portion of the cavity 35. It should be understood at this point that a separate bead receiving seat 36 is carried by each drum segment 20 at each of its ends. Although each seat 36 could be furnished with a separate boot, it is preferred that a single boot 25 be provided at each of the opposite ends of the drum 11 to cover the generally cylindrical surface generated by the plurality of bead seat 36 containing cavities 35 collectively. In this manner, there is formed in conjunction with the tension band or bands 24, a continuous cylindrical surface 19 of substantially equal diameter on which to apply the carcass building materials. It should be noted that each bead receiving area 16 has a separate boot 25 associated therewith to prevent the improper axial, or longitudinally, lateral slippage to either side of the drum 11 of the flexible support and carcass materials which may occur if only one continuous flexible support covers both bead receiving areas 16 as well as the drum median portion 15.

Figure 5:
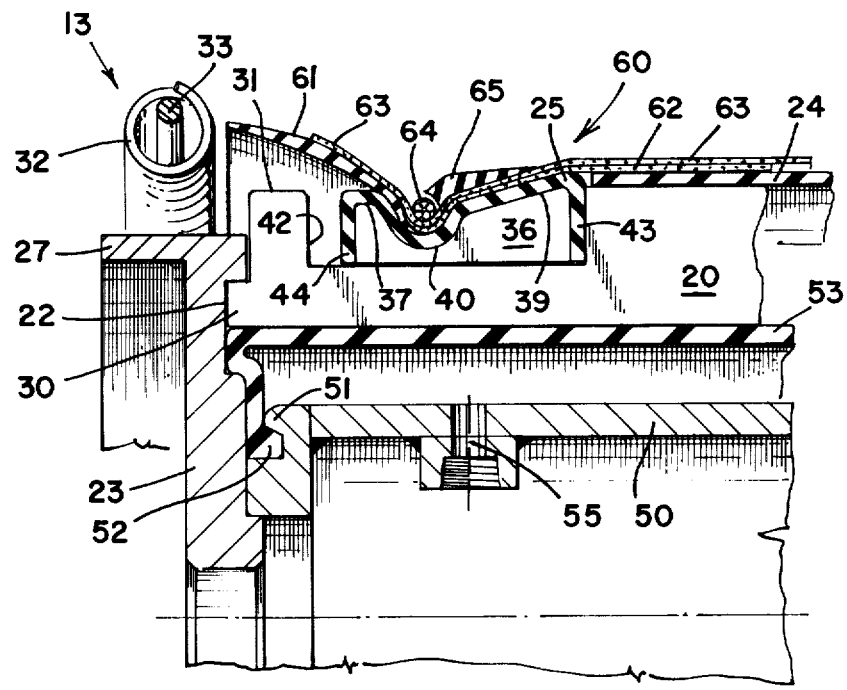
FIG. 5 is an enlarged front-elevation partially in section of a portion of the expanded drum on which the bead has been positioned in the bead receiving area and toward which a ply turnover spring is approaching.
Figure 6:
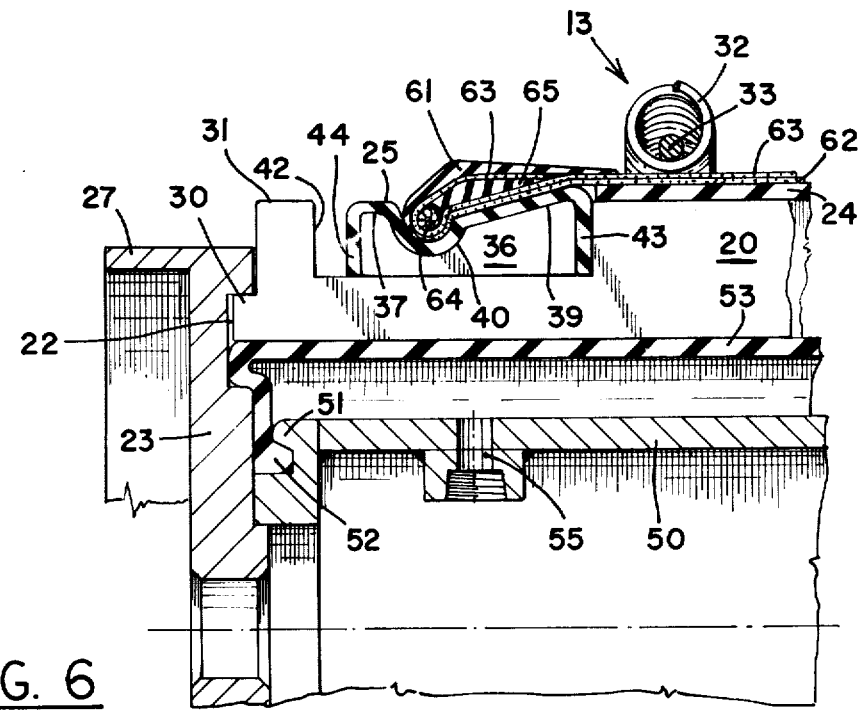
FIG. 6 is an enlarged front-elevation partially in section of a portion of the expanded drum after body ply turnover.

As can best be seen in FIGS. 4–6, the drum 11 has a cylindrical, inner core element 50 to which the end plates 23 are removably attached and which engages the driveshaft 14 (FIG. 1). The core element 50 has a flange 51 at each end which extends around the circumference of the core 50 and which secures the rim portion 52 of a bladder 53. The bladder 53 is positioned in a cavity 54 radially outwardly of the core 50, and radially inwardly of the drum segments 20. The core 50 has at least one air inlet port 55 leading from a pneumatic system (not shown), through which air may be forced to expand the bladder 53 to both extend and fill the interior cavity 54 by displacing the drum segments 20 radially outwardly to the extent permitted by the travel of the axial flange 30 in the end plate slot 22, the same being shown in FIGS. 5 and 6.

Other types of drum expanding devices are equally acceptable, including, but not limited to, those which utilize cams, linkages and the like, and these may be substituted for or used in conjunction with the bladder 53.

Uniformity in product or tire dimensions and quality is achieved through the operation of a building drum as disclosed herein. Although such a drum may well be made adjustable to produce various size tires or air springs, it is preferred that each drum be engineered for a single size, so that the inherent inability of all adjustable drums to sustain repeatability in manufacture and dimensional uniformity over a long production run is overcome. The use of a single product-size drum, plus the novel features included in the present invention, promotes the production of tires and the like whose dimensions are substantially equal to optimum engineering specifications and at a low cost relative to conventional building drum assemblies.

In the collapsed position (FIG. 1), the drum 11 provides a uniform, continuous cylindrical support surface 19 over the median portion 15 for the application of the carcass materials. The tension band or bands 24 lend smoothness and circuity to the surface 19, which could otherwise be somewhat polygonal in shaape due to its formation from the plurality of cylindrically positioned drum segments 20, particularly if the segment surface 21 is designed to be flat. The tension bands 24 also serve to preserve the continuity of the support surface 19 even after expansion of the drum 11, covering the gaps between the segments 20 as they radially expand apart from each other. In addition to the function as a support surface, the tension band or bands 24 serve to promote uniformity in the radial displacement of the expanded drum segments 20 during the building operation as well as to collapse the drum 11 upon completion of the building operation and cessation of the application of air pressure to the bladder 53. Accordingly, the tension band 24 preferably consists of a reinforced or nonreinforced elastomeric composition, such as neoprene (polychloroprene) or the like.

The support surface 19 of the median portion 15 of the drum is continued over the platform portion 26 of the boots 25 (FIG. 4), having the same external diameter as the tension band 24. The bead receiving areas 16 and shoulder portion 18 of the collapsed drum 11 (FIG. 1), corresponding to the boot slope portion 28 and boot shoulder portion 29, respectively, slope down to a lesser diameter plateau to complete the support surface 19 for the carcass materials 60. This lesser diameter portion, as was stated above, compensates for either a turnup device to be positioned beneath the carcass materials 60, or for carcass materials 60 themselves having a thickness greater than the materials run onto the median portion 15 of the support surface 19, or both. In this way, when all the carcass materials 60 are applied to the drum 11 before the beads are set, the built-up material surface is cylindrical and has a lesser outer diameter than the inner diameter of the beads to permit the travel of the beads over that surface to the vicinity of the bead receiving areas 16.

Accordingly, in this embodiment the sloped bead receiving areas 16 and shoulder portions 18 are shaped to accommodate and support the tire chafer, or abrasion strips 61 which are the first of the carcass materials 60 to be run onto the drum 11 from a conventional dispenser assembly (not shown) as the drum 11 begins rotation. The chafer 61 now in position, a uniform support surface 19 of substantially equal diameter, including the drum median 15 and shoulder portions 18 with chafer 61, is presented for the application of ply materials and beads.

The innerliner 62 is now run onto the surface of the rotating drum 11, cut to size and stitched onto itself to form a cylindrical "cover" over the drum 11 and chafer 61. Next, the first body ply 63 is run onto the drum 11 over the innerliner 62, cut and stitched in like manner. If desired, a second body ply (not shown) may also be added, as well as a bead wrap (not shown). The carcass materials 60 being comprised of green rubber, may each be stitched by conventional means. Accordingly, the chafer 61 and ply materials 62 and 63 are stitched together at this time. The surface of the drum 11 being substantially continuous, the plies 62 and 63 lie "flat" for stitching without folding or crimping into the recessed areas which are common in prior art drums.

Rotation of the drum 11 is stopped, and the beads 64 are now positioned over the bead receiving areas 16, located generally radially outwardly of the grooves 40 in the bead receiving seat 36. This may be done manually or with a conventional bead setting assembly.

The drum 11 is then expanded by increasing the air pressure in the space between the core 50 and the bladder 53 via the air inlet port 55. The bladder 53 fills the interior cavity 54 to contact the drum segments 20, and displaces the segments 20 radially outwardly to the extent permitted by the drum segment axial flanges 30 as restrained in the end plate slots 22 (FIG. 5). The drum segments 20 move apart from each adjacent segment 20 as they move radially outwardly. The tension band or bands 24, however, stretch during expansion to retain the continuous support surface 19 over the drum segments 20, just as the boots 25 stretch over the bead receiving seats 36 (FIG. 2), returning to normal during collapse of the drum 11.

As the drum 11 is expanded, each boot 25 begins to conform to the configuration of its bead receiving seats 36 as the seats 36 are displaced toward it. FIG. 2 depicts the boots 25 conforming to the seats 36 as if beads and carcass materials were positioned over them, however, the beads and carcass materials are not shown, for clarity. As a greater portion of the boot 25 is needed to cover the surface of the bead receiving seat 36 than is positioned over the seat 36 on the collapsed drum 11, the excess needed is supplied by the sliding of the boot outer leg 44 in the cavity 35 away from the cavity outer wall 42 and toward the seat 36. In addition, the carcass materials 60 conform to the configuration of the boot-covered seat 36 along with the boot 25 which in part forms their continuous support. Because of the continuous support by the tension bands 24 and boot 25 during expansion, the carcass materials 60 are prevented from falling into the groove 40, folding or crimping. The carcass materials 60 including the beads are actually carried into proper position in the groove 40 by the boot 25, and do not slide relative to the boot 25. In contrast, with previous building drums, the carcass materials themselves had to slide over the drum surface and into the grooves with the attendant possibility of ply material pulling out from under the beads or entering one groove preferentially with respect to the other. Cord (ply material) distance between the beads could fluctuate about the circumference of the grooves, causing the deleterious effects noted above.

Because the boot 25 and not the carcass materials 60 are in sliding contact with the metal surfaces of the drum 11 and bead receiving seats 36, it is possible to provide suitable lubrication between the boot 25 and seats 36 to facilitate the required lateral travel and eliminate material drag. The use of such lubricants without a boot 25 interposed between the seats 36 and the carcass materials 60, could, however, have deleterious effects upon the adhesion of such carcass materials 60, resulting in an unsuitable product.

The carcass material 60 thus being laterally stable with respect to the bead 64 positioned thereover, the body ply 63 is permitted to contact the bead 64 optimally, having a smooth and uniform contour around the bead 64.

The boot 25 may comprise a flexible material such as spring steel, but preferably comprises a reinforced or nonreinforced elastomeric composition such as neoprene or the like. If the composition has cord or flock reinforcement, such as rayon cord or the like, it is preferably reinforced across the groove 40 and either parallel to the longitudinal axis of the drum 11, or at a suitable angle with respect to such axis as are the tension bands 24, in order to prevent longitudinally lateral stretching with its attendant improper slippage of the supported materials 60. The boot 25, if elastomeric, is preferably of a thickness in the range from about 30/1000ths inches to about 5/16ths inches (0.075 cm to 0.80 cm). A metallic boot may be about 5/1000ths inches (0.012 cm) thick.

The boot-covered bead receiving seat 36 continues to move outwardly during expansion until it contacts the inner circumference of the beads 64. The beads 64 fit into the grooves 40 which have been set so as to provide the optimum distance between the beads 64 for the finished product, such as a tire, about its circumference, for the given tire size produced. The diameter of the groove 40 itself is important to the production of a quality tire. According to this embodiment of the invention, it is preferable that the rigid sidewalls of the groove 40 should extend at least about half way around the bead 64, up to a height approximately equal to one half the diameter of a cross section of the bead 64 to insure optimum bead-ply contact. This, of course, must take into account the thickness of the boot 25 and the carcass materials 60 which lie beneath the bead 64 in the groove 40. The groove 40 can be relatively deeper, as will be discussed below in more detail.

Although the bead receiving seat 36 depicted in the drawings is designed for circular cross-section beads, it is understood that the concepts of this invention are applicable to all beads of conventional design. Further, the bead receiving seats 36 are removably fastened to the drum segments 20, so that seats designed to accommodate various styles of beads may be used with the building drum 11. The use of an integral seat 36 allows beads of the various conventional designs to roll or slide into proper and exact position during expansion of the drum 11 even if the beads were not properly indexed before expansion.

The bead receiving seats 36 and the groove 40 contained therein are not spaced linearly apart the exact distance that is required between the beads 64 in the finished carcass. An allowance must be made for the distance which the beads 64 converge toward each other during drum expansion due to the tendency of the ply materials to assume the shape of the seat 36 and groove 40. Thus, the grooves 40 are positioned slightly toward the median portion 15 of the drum 11 with respect to the points on the bead receiving areas 16 where the bead rings 64 are indexed and positioned.

This distance of convergence differs, of course, with the size carcass produced. If the allowance for convergence is not made or is insufficient, the plies 62 and 63 will pull out from under the beads 64 during drum expansion. If too great an allowance is made, the plies 62 and 63 will be loose or wrinkled after drum expansion. The proper distance between the grooves 40 is established when the distance along the surface of the seats 36 and the drum median portion 15 between the beads 64 as positioned with the drum 11 expanded is substantially equal to the distance required between the beads in the finished product for the desired carcass size.

After drum expansion the bead apex 65 may be run onto the drum 11 (FIG. 5). The apex 65 is positioned against the bead 64 and over the sloped surface provided by the seat inclined portion 39 as the boot 25 and the ply materials 62 and 63 conform to it. The slope of the seat inclined portion 39 is preferably great enough so that the apex 65 utilized, when in position, displays an outer surface which is either "flat" with respect to the last applied body ply 63 (having the same external diameter as the last applied ply 63 on the drum median portion 15) or which slopes gradually down from the external diameter of ply 63 on the drum median portion 15 toward the bead 64 in the groove 40. The apex 65 is then stitched to the body ply 63.

Of course, with proper indexing, the bead apex 65 may be applied to the drum 11 before the beads 64 are positioned and before drum expansion, if desired. The exact order of application of these carcass materials 60 is not crucial to the concept of the invention, and the foregoing is presented merely for purposes of exemplification.

The carcass materials 60 having been applied to the drum 11, and the drum 11 having been expanded, the carcass materials 60 are now turned up and over the beads 64. This can be done by any conventional turnup means, or by the inboard and outboard turnover spring assemblies 12 and 13.

When the drum 11 is in the expanded position, the carcass materials 60 which extend beyond the bead receiving seat 36 and groove 40—in this instance the chafer 61, innerliner 62 and body ply 63—are partially turned up as they exit the groove 40 (FIG. 5). The pistons (not shown) which advance the turnover spring assemblies 12 and 13 are actuated, and the turnover spring assemblies 12 and 13 approach the drum 11.

The support ring 33 of each turnover spring assembly is of only slightly larger inner diameter than the outer diameter of the expanded drum mediam portion 15. The coiled springs 32, prior to the turnover step, rest generally with the greater portion of their cross section on the interior of the support rings 33 (FIG. 4). As the turnover spring assemblies 12 and 13 approach and contact the drum 11, first the end plate extensions 27, the end plates 23 and then the drum segment end portion 31, the coiled springs 32 begin to roll over the surface of the drum 11 and move outwardly such that the greater part of their cross section is exterior the support rings 38. When the coiled springs 32 contact the carcass materials 60, in this instance the chafer 61 first, the support rings 33 are tensioning the coiled springs 32 against both the carcass materials 60 and the surface of the drum 11 (FIG. 6).

Each coiled spring 32 turns, or rolls, the carcass materials 60 up and over its respective bead 64 and apex 65, such that a uniform and smooth contour of the plies 62 and 63 contact the bead 64 and apex 65 over their respective surfaces. The pressure exerted by the tensioned coil springs 32 in rolling over the carcass materials 60 actually stitches the materials together, including the turned ends of the plies 62 and 63 onto the plies 62 and 63 on the drum median portion 15.

As stated above, it is understood that other conventional types of turnover devices are also effective and may be used in the alternative, to turn the plies 62 and 63 over the beads 64. Such other turnover devices include, but are not limited to, bladders, turnup fingers, and the like.

After turnover, the spring assemblies 12 and 13 are retracted. If desired, a general stitching operation with a conventional disc stitcher may be commenced. At this point, sidewall strips (not shown) may be added to the carcass materials 60 on the drum 11, if desired. Plastic separators (not shown) are run onto the outer ply 63 where the edges of the thread will be added under the sidewall strips on the second stage building drum if the product is to be a radial tire. The sidewall strips are then run onto the drum 11, and are stitched, the plastic separators preventing their premature adhesion to the area to be covered by the edges of the thread.

Figure 7:
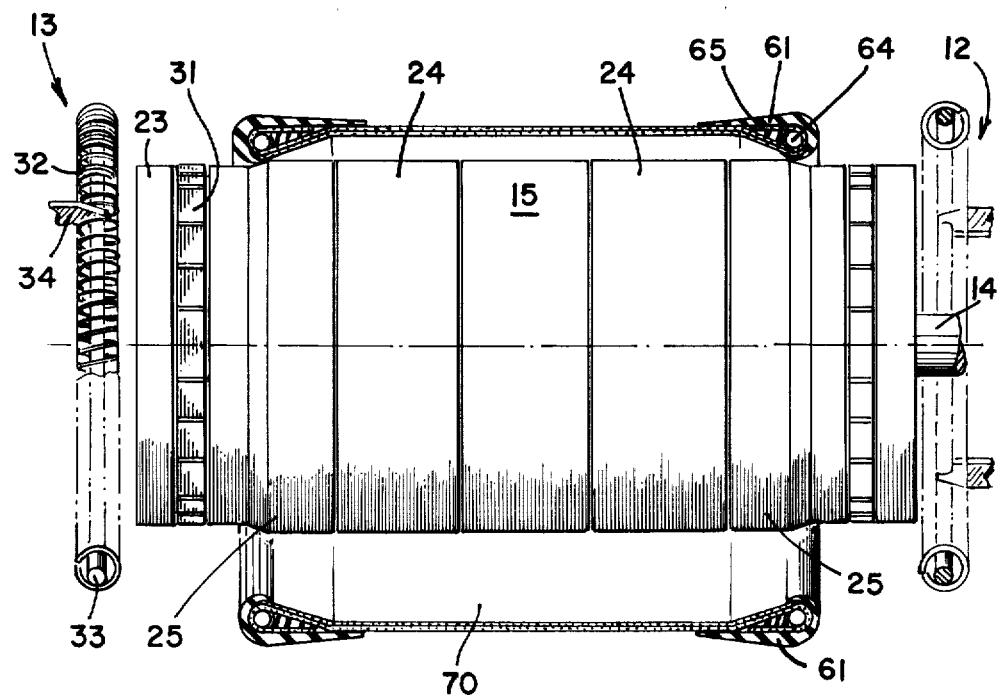
FIG. 7 is a front-elevation of the drum on which a section of a completed carcass is depicted prior to removal from the collapsed drum.

The drum 11 is then collapsed (FIG. 7), and the completed cylindrical carcass 70, which generally retains its expanded dimensions, is removed from the drum 11 on the outboard side for further building on the second stage building drum. The completed carcass 70, having uniformly positioned and secured beads with uniform ply turnover and contact about their surfaces, conforms with the dimensional specifications as desired, without variance due to the drum-related inaccuracies which previous building drums are subject to.

If the product is to be a cross-ply tire, after ply turnover and stitching, the tread and sidewall strips are run onto the carcass 70, are spliced and are stitched. The drum 11 is collapsed, and the completed cross-ply carcass 70 is removed for shaping and vulcanization in a curing press.

Figure 8:
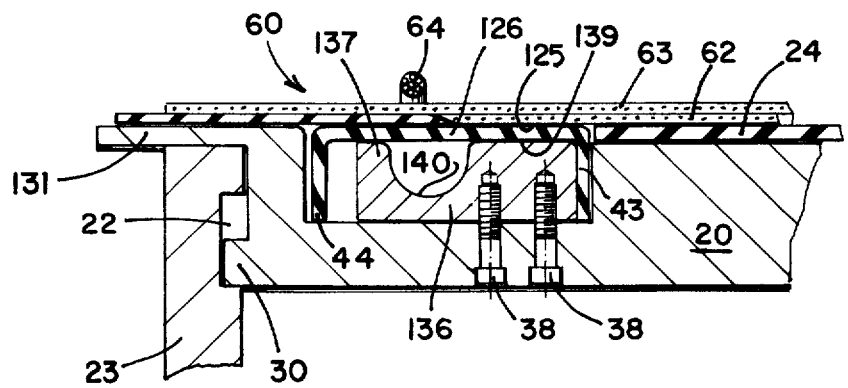
FIG. 8 is an enlarged front-elevation partially in section of a portion of an alternative embodiment of the bead receiving area showing the collapsed drum upon which body ply material has been run and a bead has been set.
Figure 9:
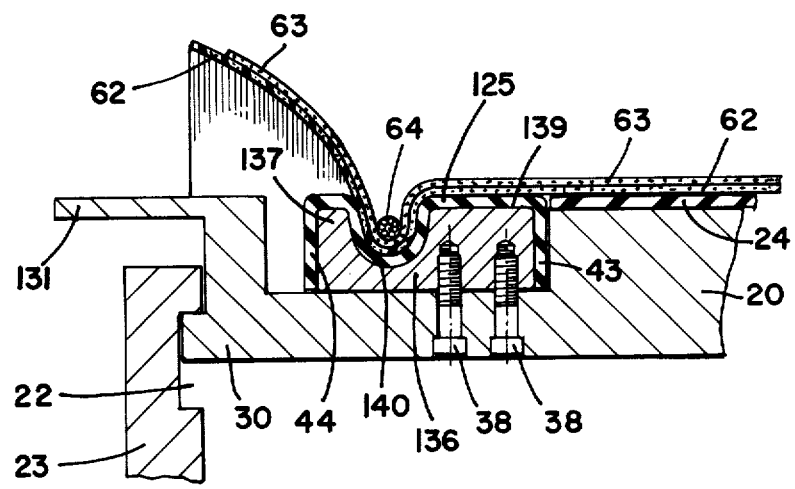
FIG. 9 is an enlarged front-elevation partially in section of a portion of an alternative embodiment of the bead receiving area showing the expanded drum on which the bead has been positioned in the bead receiving area.

In an alternative embodiment of this invention, shown in FIGS. 8 and 9, the drum 11 in the collapsed position exhibits a continuous support surface 19 of substantially constant outer diameter, with no tapering off to a lesser diameter towards the edges of the drum 11.

In the embodiment, the boot 125 lacks a sloped portion, and the platform portion 126 extends across the entire length of the bead receiving seat 136 between the inner and outer legs 43 and 44 of the boot 125. Dependent upon the design of the carcass to be built on the drum 11, such a slope portion may not be required.

The bead receiving seat 136 can also lack the inclined portion, having instead a flat plateau portion 139 in its place. This is most desirable for carcasses in which no bead apex is to be incorporated. The seat 136 which has the plateau portion 139 may also have an outer edge 137 which rises out of the groove 140 to the same height as the plateau portion 139. This allows the groove 140 to be deep enough to accommodate the entirety of the bead 64 within its rigid walls, as can be seen in FIG. 9 with the drum 11 in the expanded position, together with the boot 125 and carcass materials 60 associated with the bead 64. The bead 64 is thereby securely and accurately positioned for the ply turnup operation to commence. Returning to FIG. 8, the drum segment 20 has a shelf 131 extending axially outward to provide further support for the carcass materials 60.

A deep groove may also be provided by providing only a slight incline in the plateau portion 139 if the same is required to accommodate a bead apex 65, and by extending the outer edge 137 of the seat 136 up to the level of the end of that taper, although this groove may not be as deep as the groove 140 shown in FIGS. 8 and 9.

Thus, it can be seen that the disclosed invention carries out the objects of the invention set forth hereinabove. As will be apparent to those skilled in the art, the production of radial and cross-ply tire carcasses and other products similarly constructed, can be facilitated with the building drum assembly herein disclosed and described, the scope of the invention being limited solely by the scope of the attached claims.

I claim:

1. In a tire building drum assembly having a longitudinal axis, a plurality of longitudinally oriented drum segments mounted to be selectively movable between a radially outwardly, expanded, position and a radially inwardly, collapsed, position, said drum segments presenting, in said collapsed position, a cylindrical surface for receiving tire carcass material;
   a bead receiving area;
   said bead receiving area comprising:
      a cavity in each said drum segment forming an annular groove in said cylindrical surface;
      a rigid bead receiving seat located in the cavity of at least selected drum segments and being secured to the drum segment in which it is received;
      a flexible boot mounted on said drum segments;
      said boot having a support portion overlying said bead receiving seat to present a surface that is substantially continuous with the cylindrical surface provided by said drum segments when said drum segments are in the collapsed position for receiving said tire carcass material.

2. In a tire building drum assembly, as set forth in claim 1, wherein said bead receiving seat presents a radially outwardly facing groove accurately to receive and locate a bead, the support portion of said boot conforming to said bead seat as said drum segments are moved to the expanded position.

3. In a tire building drum assembly, as set forth in claim 2, wherein said bead receiving seat has a sloped portion with an increasing outer diameter as it extends from said groove axially inwardly toward the medial portion of said drum assembly.

4. In a tire building drum assembly, as set forth in claim 2, wherein said boot employs a first leg attached to the support portion of said boot and a second leg attached to the support portion of said boot, said first and second legs being longitudinally spaced with respect to the building drum assembly on which said boot is supported.

5. In a tire building drum assembly, as set forth in claim 4, wherein the cavity in each said drum segment has first and second longitudinally spaced, radially oriented walls, said first leg on said boot being anchored between said first wall and said bead seat, said second leg on said boot being freely movable between said second wall and said bead seat to permit the support portion of said boot to accommodate to the radially outwardly directed configuration of said bead seat as said drum segments are moved to the expanded position.

6. In a tire building drum assembly, as set forth in claim 5, wherein said boot comprises an elastomeric composition.

7. In a tire building drum assembly, as set forth in claim 6, wherein said elastomeric composition is reinforced.

8. In a tire building drum assembly, as set forth in claim 2, wherein said drum assembly includes axially spaced end plates, each end plate being provided with a plurality of radially disposed slots, each drum segment having at least one axial flange slidably engaged with one of the slots on each end plate and means selectively to displace said drum segments radially along said slots.

9. In a tire building drum assembly, as set forth in claim 8, wherein the means for displacing said drum segments radially outwardly comprises a bladder.

10. In a tire building drum assembly, as set forth in claim 9, wherein a pair of axially spaced annular grooves are provided in the cylindrical surface formed by said drum segments and at least one flexible tension band covers substantially the entire medial portion of said drum assembly between said axially spaced grooves, said flexible tension band comprising the means by which said drum segments are displaced radially inwardly along said slots and further serving to define the radially outermost surface on which the tire carcass material is received.

* * * * *